(12) United States Patent
Kiyozaki

(10) Patent No.: US 7,757,104 B2
(45) Date of Patent: Jul. 13, 2010

(54) INTEGRATED CIRCUIT AND SIGNAL PROCESSING APPARATUS USING THE SAME

(75) Inventor: Kenichi Kiyozaki, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 660 days.

(21) Appl. No.: 11/688,593

(22) Filed: Mar. 20, 2007

(65) Prior Publication Data
US 2007/0223161 A1 Sep. 27, 2007

(30) Foreign Application Priority Data
Mar. 23, 2006 (JP) ............................ 2006-080795

(51) Int. Cl.
*G06F 1/28* (2006.01)
(52) U.S. Cl. .................. 713/300; 713/320; 713/324; 713/340
(58) Field of Classification Search .................. 713/300, 713/320, 324, 340
See application file for complete search history.

(56) References Cited

U.S. PATENT DOCUMENTS

| | | | | |
|---|---|---|---|---|
| 6,084,390 A * | 7/2000 | Youssef | ...................... | 323/315 |
| 6,338,143 B1 * | 1/2002 | Shimazaki | .................. | 713/340 |
| 6,904,488 B2 * | 6/2005 | Matsumoto et al. | ......... | 710/313 |
| 6,904,532 B2 * | 6/2005 | Matsumoto | .................. | 713/320 |
| 6,934,863 B2 * | 8/2005 | Yin | ............................ | 713/300 |
| 6,975,551 B2 * | 12/2005 | Iwata et al. | .................. | 365/226 |
| 7,013,396 B2 * | 3/2006 | Haider | ........................ | 713/300 |
| 7,064,534 B2 * | 6/2006 | McClure et al. | .............. | 323/314 |
| 7,068,456 B2 * | 6/2006 | Walz | ........................ | 360/73.03 |
| 7,132,767 B2 * | 11/2006 | McClure et al. | ............. | 307/125 |
| 7,312,968 B2 * | 12/2007 | Kahara et al. | .............. | 361/93.1 |
| 7,441,132 B2 * | 10/2008 | Haider | ........................ | 713/300 |
| 7,581,123 B2 * | 8/2009 | Fukuta | ....................... | 713/300 |

FOREIGN PATENT DOCUMENTS

| | | |
|---|---|---|
| CN | 1308261 A | 8/2001 |
| JP | 2001-184146 | 7/2001 |

OTHER PUBLICATIONS

State Intellectual Property Office of the P.R.C., Notification of Examination Remarks for Application No. 200710005720.7, Issuing Date Jul. 11, 2008.

* cited by examiner

*Primary Examiner*—Thomas Lee
*Assistant Examiner*—Zahid Choudhury
(74) *Attorney, Agent, or Firm*—SoCal IP Law Group LLP; Steven C. Sereboff; John E. Gunther

(57) ABSTRACT

An integrated circuit comprising a source voltage monitoring unit that monitors the level of a first source voltage supplied from an external power source, determines whether the first source voltage is supplied from the external power source, and controls an internal power source and the external power source; so as to apply the first source voltage, when determining that the first source voltage is supplied; and so as to apply a second source voltage supplied from the internal power source, whose level is lower than that of the first source voltage, when determining that the first source voltage is not supplied, wherein the integrated circuit operates with application of either one of the first source voltage and the second source voltage.

9 Claims, 4 Drawing Sheets

INTEGRATED CIRCUIT AND SIGNAL PROCESSING APPARATUS USING THE SAME

CROSS-REFERENCE TO RELATED APPLICATION

This application claims the benefit of priority to Japanese Patent Application No. 2006-80795, filed Mar. 23, 2006, of which full contents are incorporated herein by reference.

BACKGROUND OF THE INVENTION

1. Field of the Invention

The present invention relates to an integrated circuit and a signal processing apparatus by use thereof.

2. Description of the Related Art

In accordance with a recent progress of electronic technology, there has been a remarkable spread of signal processing apparatuses that have a selling point of portability for handiness of carrying and execute signal processing for desired applications such as portable audio players, cellular phones, portable game machines, and PDAs (Personal Digital Assistants). Such signal processing apparatuses achieve the portability by mounting an internal power source composed of a secondary battery (nickel hydrogen rechargeable battery, lithium ion rechargeable battery, etc.) and a primary battery (alkaline battery, manganese battery, etc.) (see, e.g., Japanese Patent Application Laid-Open Publication No. 2001-184146).

In this connection, long-time execution of the desired application only with a source voltage of the internal power source will necessarily result in an increased power consumption of the internal power source. Accordingly, in consideration of the fact that a large variety of applications are executed for a long time, measures to further reduce the power consumption is essential for the signal processing apparatus and existing measures are insufficient.

SUMMARY OF THE INVENTION

In order to solve the above problem, according to a major aspect of the present invention there is provided an integrated circuit comprising a source voltage monitoring unit that monitors the level of a first source voltage supplied from an external power source, determines whether the first source voltage is supplied from the external power source, and controls an internal power source and the external power source: so as to apply the first source voltage, when determining that the first source voltage is supplied; and so as to apply a second source voltage supplied from the internal power source, whose level is lower than that of the first source voltage, when determining that the first source voltage is not supplied, wherein the integrated circuit operates with application of either one of the first source voltage and the second source voltage.

The present invention enables reduced power consumption by the integrated circuit by appropriately controlling the source voltage supplied depending on the state of supply of external power source.

BRIEF DESCRIPTION OF THE DRAWINGS

For more thorough understanding of the present invention and advantages thereof, reference should be made to the following description together with accompanying drawings.

DETAILED DESCRIPTION OF THE INVENTION

At least the following matters will become apparent from this specification and accompanying drawings.

<External Connection of Signal Processing Apparatus>

Figure 1:
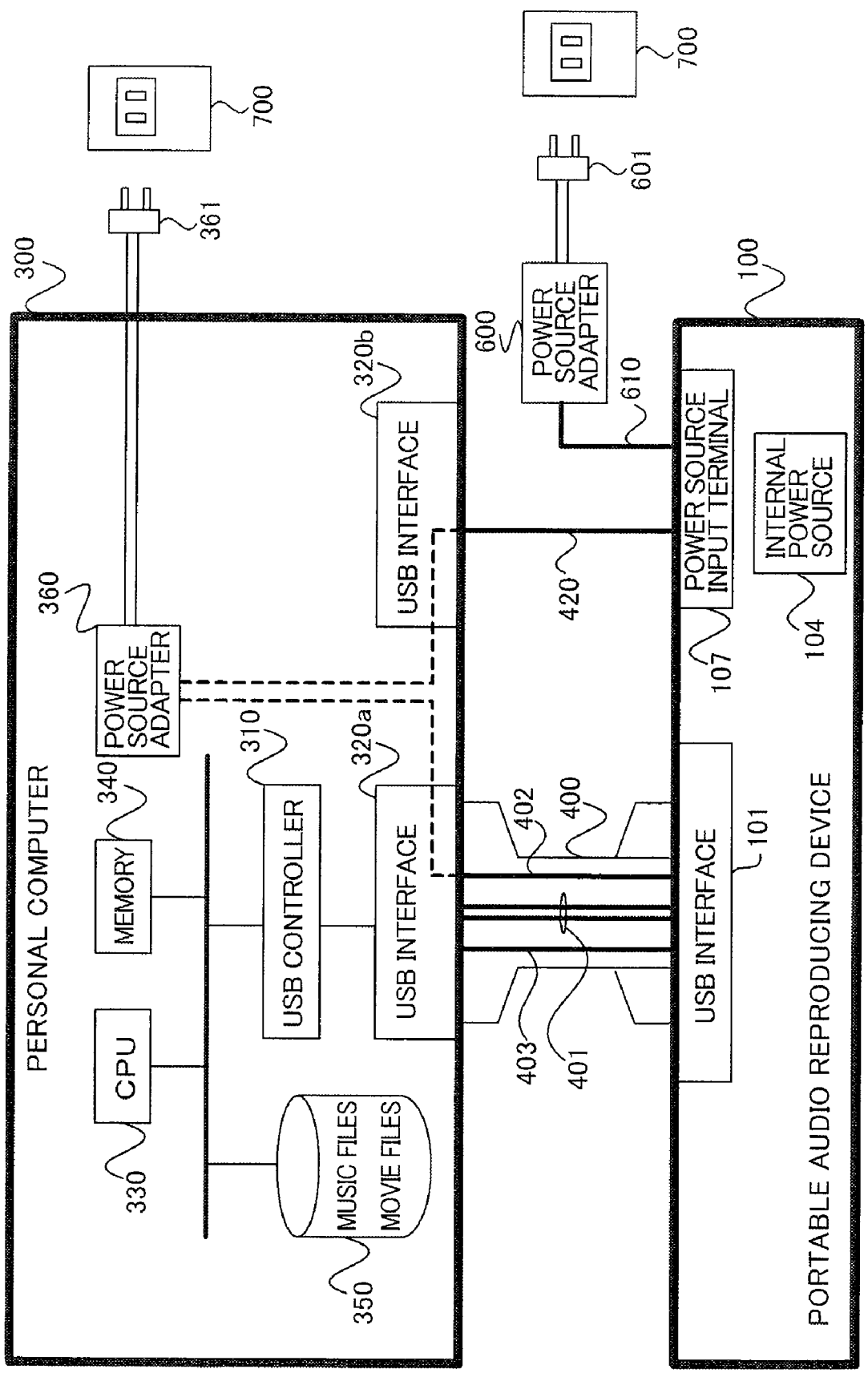
FIG. 1 is an explanatory diagram of external connection of a signal processing apparatus according to the present invention.

FIG. 1 is an explanatory diagram of external connection of a signal processing apparatus according to the present invention. In the following, description will be made of a portable audio reproducing device 100 having a USB (Universal Serial Bus) interface 101 that performs digital reproduction of compressed audio data transferred from a personal computer 300 by way of a data line 401 of a USB cable 400 as an example of the signal processing apparatus according to the present invention. The signal processing apparatus according to the present invention may be, for example, a cellular phone, a portable game machine, a PDA, etc.

The USB is a serial interface standard that enables a variety of signal processing apparatuses with common USB interface to be connected to a USB host device. The latest version of the USB is "USB2.0" that has three transfer modes of LS (Low Speed), FS (Full Speed), and HS (High Speed), with the three modes being selectable depending on applications. The USB permits a maximum number of 127 USB devices to be connected to a host in a tree structure by use of hubs and accommodates a hot plug that permits a new USB device to be connected to the USB host device while the host is powered on.

Firstly it is assumed that the personal computer 300 is equipped with a USB controller 310 and two ports of USB interface 320a and 320b. In this case, by connecting either one of the two ports of the USB interfaces 320a and 320b in the personal computer 300 and a USB interface 101 in the portable audio reproducing device 100 using the USB cable 400, the personal computer 300 and the portable audio reproducing device 100 are connected. The USB cable 400 comprises a two-line data line 401, a power line 402, a GND line 403 and each of the USB interfaces 320a and 101 is equipped with a pair of data terminals D+ and D−, a power terminal VBUS, and a GND terminal.

The personal computer 300 has a power source adapter 360 that converts an AC source voltage supplied from a commercial power source 700 to which a power plug 361 is inserted to a DC source voltage, and has a CPU 330 in charge of overall control, a memory 340 such as a ROM for storing various programs, and a hard disk 350 for storing music files, movie files, etc., interconnected for mutual communication. The music files stored in the hard disk 350 are compressed audio data, for example, of MPEG-1 Audio Layer 3 (MP3) format, etc., and the movie files stored in the hard disk 350 are compressed movie data, for example, of MPEG-2 format, MPEG-4 format, etc.

Description will then be made of an outline of the data transfer of the music files from the personal computer 300 to the portable audio reproducing device 100. Firstly, the personal computer 300 runs the program stored in the memory 340 and, by polling request, etc., recognizes the portable audio reproducing device 100 as a USB device connected to itself. Next, the personal computer 300 reads out an arbitrary music file from the hard disk 350 and transfers the data to the USB controller 310. The USB controller 310 converts the music file read out from the hard disk 350 to the packet format and performs communication protocol processing conforming to the USB standard for differential half duplex transmission to the portable audio reproducing device 100 by way of the USB interface 320a and the USB cable 400. As a result, the portable audio reproducing device 100 can take in the music file from the personal computer 300.

When the data transfer of the music file from the personal computer 300 is completed, the portable audio reproducing device 100 executes reproducing processing of the music file, generally with the USB cable 400 disconnected from the USB interface 101.

<External Power Source Usable by Signal Processing Apparatus>

There are three cases of power supply to the portable audio reproducing device 100 equipped with the USB interface 101 described above: the case of external power supply from the personal computer 300 to the USB interface 101 by way of the USB cable 400 (hereinafter, case A), the case of the external power supply from the personal computer 300 to a power source input terminal 107 by way of a USB auxiliary cable 420 (hereinafter, case B), and the case of the external power supply from an power source adapter 600 to the power source input terminal 107 by way of a power cable 610 (hereinafter, case C).

In the following, description will be made of each of these three cases.

===Case A===

The personal computer 300 can supply the DC source voltage generated at the power source adapter 360 (hereinafter, source voltage VBUS) to the portable audio reproducing device 100 by use of the power line 402 provided in the USB cable 400. In other words, the portable audio reproducing device 100 can receive the supply of the source voltage VBUS together with the transfer of the music file from the personal computer 300.

Therefore, the portable audio reproducing device 100 can perform the communication protocol processing conforming to the USB standard with the personal computer 300 and the reproducing processing of the music file, using the source voltage VBUS supplied by the personal computer 300 as an operating voltage, to restrain the power consumption of the internal power source 104.

===Case B===

By connecting one end of the USB power source auxiliary cable 420 to the USB interface 320b and the other end thereof to the power source input terminal 107, only the source voltage VBUS of the personal computer 300 can be supplied to the portable audio reproducing device 100. As a result, the portable audio reproducing device 100 has the source voltage VBUS supplied to it from the USB interface 320b, without performing the data communication.

===Case C===

The portable audio reproducing device 100 can also receive the external power supply from the power source adapter 600 with its power plug 601 inserted in an outlet of a commercial power source 700, by way of a power cable 601. Charging the internal power source 104 without connecting with the personal computer 300 is conceivable for this case C.

<Configuration of Portable Audio Reproducing Device>

Figure 2:
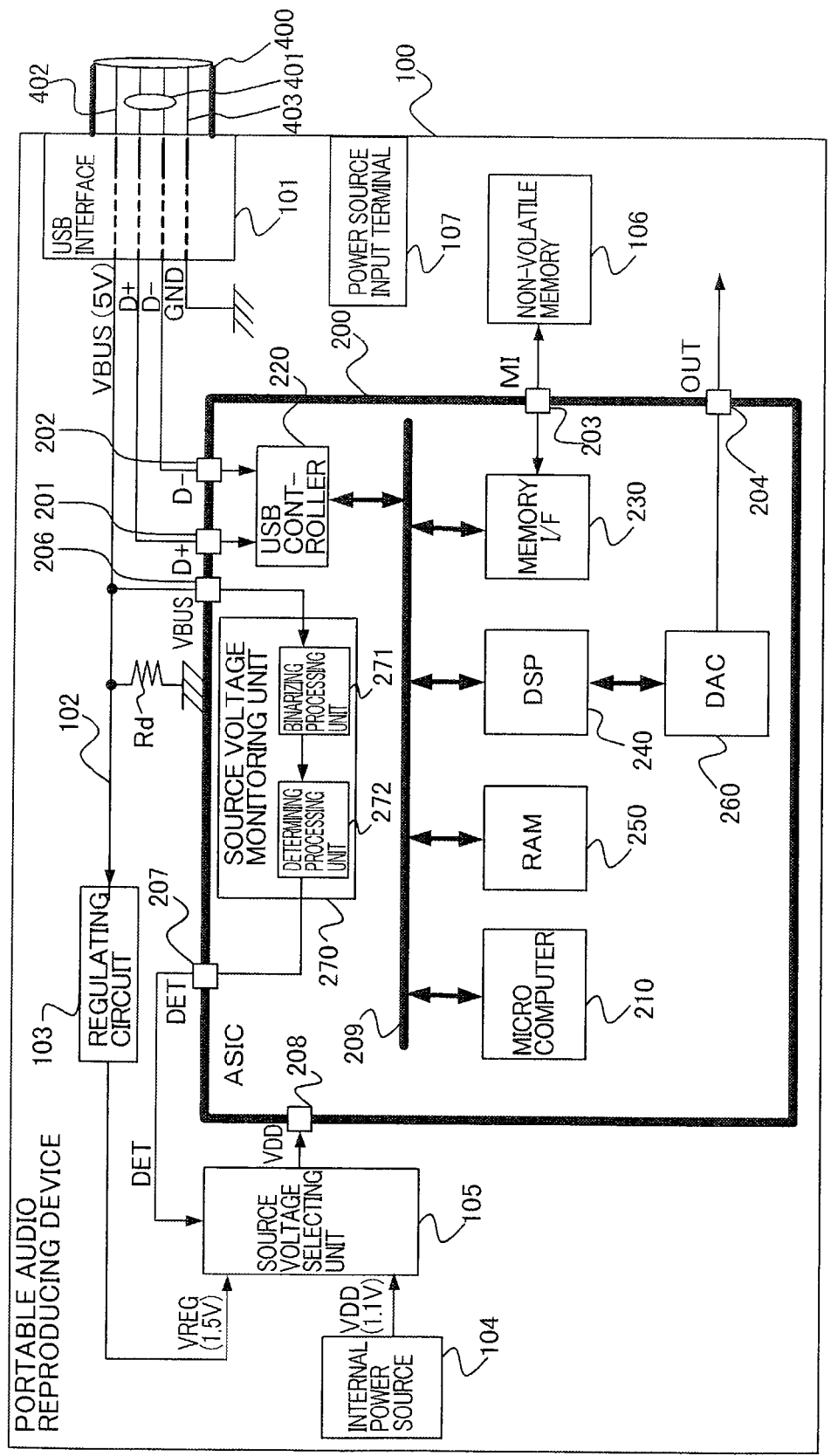
FIG. 2 is a configuration diagram of the signal processing apparatus according to the present invention.

FIG. 2 is a diagram of a configuration of the portable audio reproducing device 100. As shown in FIG. 2, the portable audio reproducing device 100 comprises an ASIC (Application Specific Integrated Circuit) 200 as an embodiment of "integrated circuit" according to the present invention and its peripheral circuits. The "integrated circuit" is realized by the ASIC 200 in this embodiment, but may also be realized by an FPGA (Field Programmable Gate Array) or a PLD (Programmable Logic Device).

In the following, description will be made of the configuration of the portable audio reproducing device 100, divided into two separate parts, the configuration of the peripheral circuits of the ASIC 200 and the configuration of the ASIC 200.

===Configuration of ASIC Peripheral Circuits===

The USB interface 101 is an interface to connect for communication with the personal computer 300 by way of the USB cable 400 containing the power line 402. Namely, the USB interface 101 is provided with a pair of data terminals D+ and D−, a power supply terminal VBUS, and a GND terminal, in correspondence to the configuration of the USB cable 400.

A regulating circuit 103 generates a regulated source voltage VREG ("first source voltage" according to the present invention) by regulating the level of the source voltage VBUS of a power line 102 wired from the USB interface 101 to operating voltages (3.3 V, 1.5 V, etc.) necessary for execution by ASIC 200 of the communication protocol processing for which a high speed is required (HS mode, FS mode, etc.).

The source voltage that can be supplied from the personal computer 300 as USB bus power is specified to be within the range of "+4.75 V to +5.25 V" and in this embodiment, the level of the source voltage VBUS is determined as "5 V". The level of regulated source voltage VREG is determined as "1.5 V".

The internal power source 104 is a power source comprising one or more secondary batteries (such as the nickel hydrogen rechargeable battery (nominal voltage of 1.2 V) and the lithium ion rechargeable battery (nominal voltage of 3.6 V to 3.7 V)) or one or more primary batteries (such as the alkaline battery (nominal voltage of 1.5 V) and the manganese battery (nominal voltage of 1.5 V)) and generates a source voltage VDD ("second source voltage" according to the present invention) of a level lower than that of the regulated source voltage VREG. When the internal power source 104 comprises the secondary battery, the battery is charged by the USB power source connected to the USB interface 101 or the power source adapter 600 connected to the power source input terminal 107.

In this embodiment, the internal power source 104 is assumed to be composed of the nickel hydrogen rechargeable battery (nominal voltage of 1.2 V) that is rechargeable and is the secondary battery of the lowest nominal voltage. The source voltage VDD should preferably be at the level as low as possible for the lower power consumption of the ASIC 200, but taking into account the normally operable range of the ASIC 200 and a semiconductor process of the ASIC 200, the source voltage VDD is assumed to be "1.1 V", the order of 90% of the nominal voltage (1.2 V).

When a source voltage selecting unit 105 determines, based on a selecting signal DET supplied from a source voltage monitoring unit 270 to be described later by way of a DET terminal 207, that the source voltage VBUS is being supplied from the personal computer 300 to the portable audio reproducing device 100, the source voltage selecting unit 105 selects the regulated source voltage VREG. On the other hand, when the source voltage selecting unit 105 determines, based on the selecting signal DET, that the source voltage VBUS is not being supplied from the personal computer 300 to the portable audio reproducing device 100, the source voltage selecting unit 105 selects the source voltage VDD.

A non-volatile memory 106 is an external memory for storing the music files transferred from the personal computer 300 by way of the USB cable 400. The non-volatile memory 106 may be, for example, a flash memory. Other than this embodiment, when a larger volume of data is stored, a hard disk (not shown) may be employed in place of the non-volatile memory 106.

===Configuration of ASIC===

The ASIC 200 comprises terminals of a D+ terminal 201, a D− terminal 202, an MI terminal 203, an OUT terminal 204, a VBUS terminal 206, a DET terminal 207, and a VDD terminal 208.

The D+ terminal 201 and the D− terminal 202 are an input/output terminals for connection to the data terminals D+ and D−, respectively, of the USB interface 101. The MI terminal 203 is an input/output terminal for connection to the non-volatile memory 106. The OUT terminal 204 is an output terminal for outputting results of reproduction of the music files.

The VBUS terminal 206 is an input terminal for connection to the power line 102 wired from the power source terminal of the USB interface 101. The DET terminal 207 is an output terminal for outputting the selecting signal DET as the result of determination by the source voltage monitoring unit 270. The VDD terminal 208 is an input terminal to which either one of the regulated source voltage VREG and the source voltage VDD as selected by the source voltage selecting unit 105 is applied.

The ASIC 200 comprises a microcomputer 210, a USB controller 220, a memory interface circuit 230, a DSP (Digital Signal Processor) 240, a RAM 250, and a D/A converter 260, all connected with one another for mutual communication by way of an internal bus 209, and further comprises the source voltage monitoring unit 270.

The microcomputer 210 is a processor in control of the ASIC 200 as a whole. The microcomputer 210 supervises and controls the communication protocol processing at the USB controller 220, reproducing processing of the music files at the DSP 240, etc.

The USB controller 220 performs the processing of the communication protocol with the personal computer 300 and comprises a USB transceiver that relays to the internal bus 209 of the ASIC 200 the data differentially input to the D+ terminal 201 and the D-terminal 202 from the USB interface 101, a decoder that decodes packets, a FIFO used as a buffer, etc. For example, the USB controller 220, upon command from the microcomputer 210, transfers the music file data transferred from the personal computer 300 to the memory interface circuit 230 by way of the internal bus 209.

The memory interface circuit 230 is a circuit for controlling the reading or writing of the data between the ASIC 200 and the non-volatile memory 106 connected to the MI terminal 203. For example, the memory interface circuit 230 performs the processing of writing the music file transferred from the USB controller 220 to the non-volatile memory 106.

The DSP 240 is a circuit for performing the digital signal processing associated with the reproduction of the music file. For example, at the time of reproducing the music file, upon command from the microcomputer 210, the music file written to the non-volatile memory 106 is read out by the memory interface circuit 230 and is stored in the RAM 250 as a working memory. The DSP 240 reads out the music file stored in the RAM 250 and performs decoding processing in conformity to the data format thereof (e.g., the MP3 decoding, etc.). Then, thus decoded digital signal is converted to an analog signal by the D/A converter 260 and thereafter, is output to the outside by way of the OUT terminal 204.

The source voltage monitoring unit 270 determines whether the source voltage VBUS is being supplied from the personal computer 300, by monitoring the level of the source voltage VBUS that can be supplied from the personal computer 300 by way of the power line 402 when the USB cable 400 is connected to the USB interface 101.

To be more specific, a pull-down resistor Rd is provided in advance on the power line 102 electrically connected to the power line 402 by way of the USB interface 101. Then, when the USB cable 400 is connected to the USB interface 101 and the source voltage VBUS is supplied from the personal computer 300, the level of the voltage applied to the VBUS terminal 206 becomes "5 V". On the other hand, when the USB cable 400 is disconnected from the USB interface 101, the source voltage VBUS is not supplied from the personal computer 300, and therefore, the level of the voltage applied to the VBUS terminal 206 becomes "0 V", due to the pull-down resistor Rd.

The source voltage monitoring unit 270 comprises a binarizing processing unit 271 and a determining processing unit 272. The binarizing processing unit 271, by comparing the level of the voltage applied to the VBUS terminal with a predetermined reference level Vth (e.g., 2.5 V), outputs either a High level or a Low level.

The determining processing unit 272, by measuring a period of time of the High level or the Low level output from the binarizing processing unit 271, determines that the source voltage VBUS is being supplied from the personal computer 300 when the High level has continued for a certain period of time Th and that the source voltage VBUS is not being supplied from the personal computer 300 when the Low level has continued for a certain period of time Th. In this manner, by not making determination until after the High level or the Low level output by the binarizing processing unit 271 has continued for a certain period of time Th, an erroneous result of determination can be prevented from occurring, for example, due to a power source noise of a spike form.

The result of determination by the determining processing unit 272 is used as the selecting signal DET for the selection by the source voltage selecting unit 105 of either the regulated source voltage VREG or the source voltage VDD. Since the source voltage selecting unit 105 is a peripheral circuit of the ASIC 200, the selecting signal DET is output to the source voltage selecting unit 105 by way of the DET terminal 207.

When the source voltage VBUS is supplied from the personal computer 300 to the portable audio reproducing device 100, the regulated source voltage VREG of the level higher than that of the source voltage VDD is selected so that the power of the internal power source 104 may not be consumed. As a result, the portable audio reproducing device 100 can use the regulated source voltage VREG as the operating voltage, without bothering about the power consumption of the internal power source 104, and can perform the processing of reproducing the music file, using the regulated source voltage VREG as the operating voltage, while restraining the power consumption of the internal power source 104.

On the other hand, when the USB cable 400 is not connected to the USB interface 101 and the source voltage VBUS is not supplied from the personal computer 300 to the portable audio reproducing device 100, the source voltage VDD is selected that is of the level lower than that of the regulated source voltage VREG and of the level minimally required for causing the ASIC 200 to operate and therefore, the power consumption of the ASIC 200 can be reduced. As a result of lowered power consumption of the ASIC 200, a reproducing time of the music file can be extended.

<Operation of ASIC>

===Operation in Case of Disconnecting USB Cable===

Figure 3:
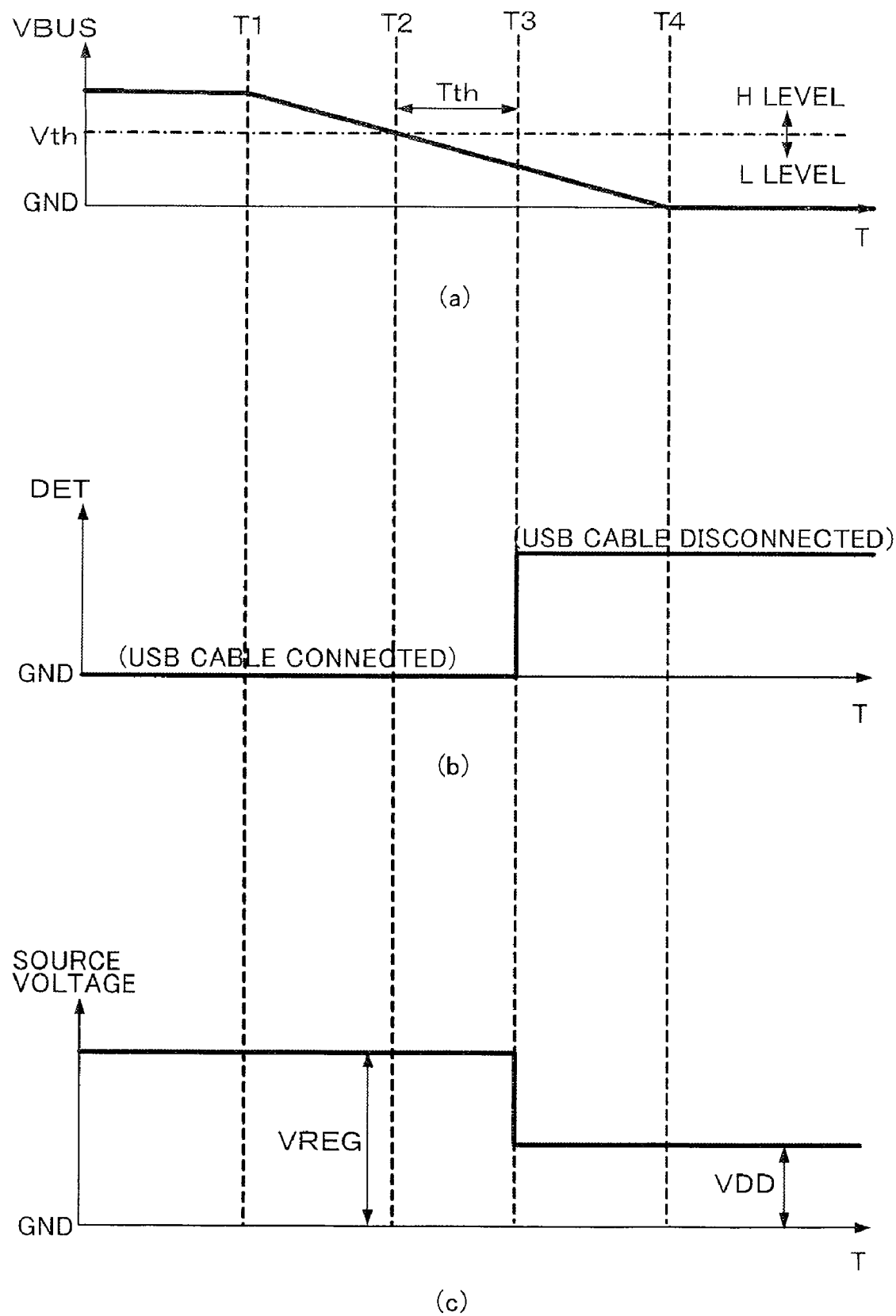
FIG. 3 is waveform diagrams of primary signals for description of operation of an integrated circuit according to the present invention.

Description will be made of the operation of the ASIC 200 when, following the completion of the data transfer of the music file, the situation where the USB cable 400 is connected to the USB interface 101 is switched to the situation where the USB cable 400 is disconnected, with reference to FIG. 3. FIG. 3(a) depicts a waveform of the level of the voltage applied to the VBUS terminal 206, FIG. 3(b) depicts a waveform of the selecting signal DET output from the source voltage monitoring unit 270, and FIG. 3(c) depicts a waveform of the source voltage applied to the VDD terminal 208.

Firstly, the case is assumed to be that the USB cable 400 is connected to the USB interface 101 and the music file is data-transferred, and the source voltage VBUS ("5 V") is supplied, from the personal computer 300 to the portable audio reproducing device 100 (case A).

Consequently, the level of the voltage applied to the VBUS terminal 206 is "5 V" (see FIG. 3(a)) and the source voltage monitoring unit 270 determines that the source voltage VBUS is being supplied from the personal computer 300 (DET at Low level) (see FIG. 3(b)). As a result, the source voltage selecting unit 105 selects the regulated source voltage VREG, based on the Low level of the selecting signal DET (see FIG. 3(c)).

At time T1, the USB cable 400 is disconnected from the USB interface 101. In this case, from time T1 toward time T4, the level of the voltage applied to the VBUS terminal 206 is attenuated to "0 V", due to the pull-down resistor Rd connected to the power line 102 (see FIG. 3(a)).

Next, at time T2, the level of the voltage applied to the VBUS terminal 206 is below the reference level Vth (see FIG. 3(a)) and the output of the binarizing processing unit 271 is at Low level. However, to prevent the erroneous determination due to the power source noise of the spike form, the selecting signal DET output from the determining processing unit 272 remains at Low level (see FIG. 3(b)).

Then, at time T3, after an elapse of a certain time Tth after time T2, since the output of the binarizing processing unit 271 is still at Low level, the determining processing unit 272 does not consider it to be a level change attributable to the power source noise and switches the selecting signal DET from Low level to High level. As a result, the source voltage selecting unit 105 selects the source voltage VDD based on the High level of the selecting signal DET (see FIG. 3(c)). After time T4 following time T3, the ASIC 200 performs the processing of reproducing the music file, etc., using the source voltage VDD as the operating voltage.

===Operation in Case of Connecting USB Cable===

Figure 4:
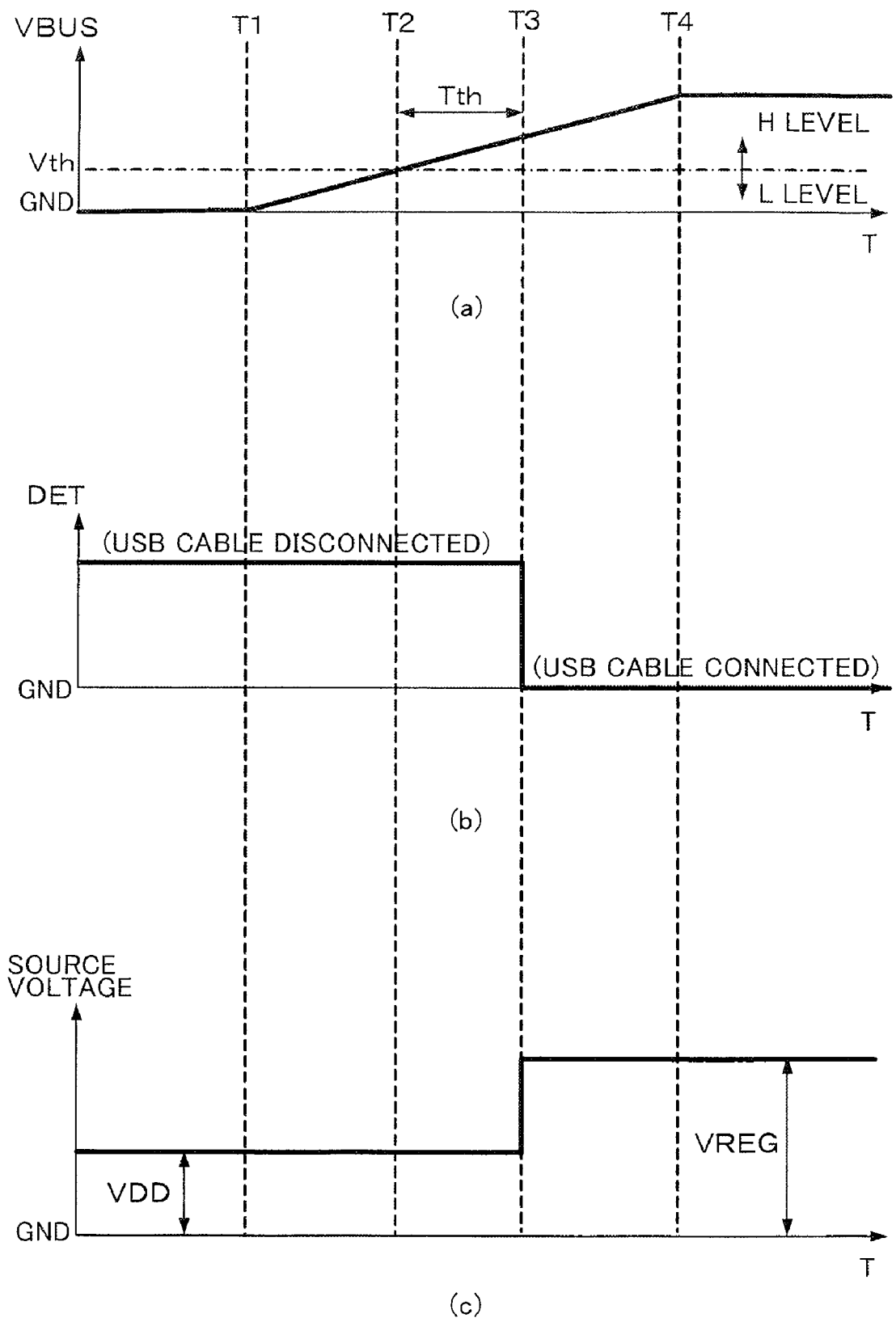
FIG. 4 is waveform diagrams of primary signals for description of operation of the integrated circuit according to the present invention.

Description will be made of the operation of the ASIC 200 when, to execute the data transfer of the music file, the situation where the USB cable 400 is disconnected from the USB interface 101 is switched to the situation where the USB cable 400 is connected to the USB interface 101, with reference to FIG. 4. FIGS. 4(a), 4(b), and 4(c) depict same kinds of waveforms as shown in FIGS. 3(a), 3(b), and 3(c), respectively.

Firstly, the case is assumed to be that the USB cable 400 is disconnected from the USB interface 101 and the portable audio reproducing device 100 is not supplied with the source voltage VBUS from the personal computer 300.

Consequently, the level of the voltage applied to the VBUS terminal 206 is "0 V" (see FIG. 4(a)) and the source voltage monitoring unit 270 determines that the source voltage VBUS is not being supplied from the personal computer 300 (DET at High level) (see FIG. 4(b)). As a result, the source voltage selecting unit 105 selects the source voltage VDD, based on the High level of the selecting signal DET (see FIG. 4(c)).

At time T1, it is assumed that the USB cable 400 is connected to the USB interface 101. In this case, from time T1 toward time T4, the level of the voltage applied to the VBUS terminal 206 increases from "0 V" to "5 V" (see FIG. 4(a)).

Next, at time T2, the level of the voltage applied to the VBUS terminal 206 is above the reference level Vth (see FIG. 4(a)) and the output of the binarizing processing unit 271 is at High level. However, to prevent the erroneous determination due to the power source noise of the spike form, the selecting signal DET output from the determining processing unit 272 remains at High level (see FIG. 4(b)).

Then, at time T3, after an elapse of a certain time Tth after time T2, since the output of the binarizing processing unit 271 is still at High level, the determining processing unit 272 does not consider it to be a level change attributable to the power source noise and switches the selecting signal DET from High level to Low level (see FIG. 4(b)). Incidentally, during the period from time T1 to time T3, the regulated source voltage VREG is generated by the regulating circuit 103. As a result, the source voltage selecting unit 105 selects the regulated source voltage VREG based on the Low level of the selecting signal DET (see FIG. 4(c)). As a result, after time T4 following time T3, the ASIC 200 performs the communication protocol processing, using the regulated source voltage VREG as the operating voltage.

While description has been made of the embodiment of the present invention, the above embodiment is intended for easy understanding of the present invention and is not to be construed to limit the present invention. Changes and improvements can be made to the present invention without departing from the spirit thereof and the present invention encompasses equivalents thereof.

It is claimed:

1. An integrated circuit comprising
   a source voltage monitoring unit that
      monitors a level of a first source voltage supplied from an external power source,
      determines whether the first source voltage is supplied from the external power source, and
      controls application of an internal power source and the external power source, wherein
   the source voltage monitoring unit controls so as to apply the first source voltage when determining that the first source voltage is supplied, and so as to apply a second source voltage supplied from the internal power source, whose level is lower than that of the first source voltage, when determining that the first source voltage is not supplied, and
   the integrated circuit operates with application of either one of the first source voltage and the second source voltage,
   the source voltage monitoring unit including
      a binarizing processing unit that outputs a binarized signal at either a High level or a Low level by comparing the level of a voltage at a terminal to which the first source voltage is applied with a predetermined reference level, and
      a determining processing unit that generates a selecting signal for selecting either the first source voltage or the second source voltage when the binarized signal output from the binarizing processing unit has continued at either the high level or the low level for a predetermined time.

2. The integrated circuit of claim 1, wherein
the internal power source is a secondary battery capable of supplying the second source voltage.

3. The integrated circuit of claim 1, wherein
the first source voltage is supplied from an interface for performing data communication.

4. The integrated circuit of claim 1, further comprising a digital signal processing circuit that performs processing of decoding digital data, wherein
the digital signal processing circuit operates in accordance with either one of the first source voltage and the second source voltage the selection of which is controlled by the source voltage monitoring unit.

5. A signal processing apparatus comprising the integrated circuit of claim 1, wherein
the signal processing apparatus further comprises a source voltage selecting unit that outputs either one of the first source voltage and the second source voltage in accordance with a result of determination by the source voltage monitoring unit, the source voltage selecting unit being connected to the external power source and the internal power source, and wherein the integrated circuit operates in accordance with either one of the first source voltage and the second source voltage as output by the source voltage selecting unit.

6. The signal processing apparatus of claim 5, further comprising a regulating circuit that regulates the level of the source voltage supplied from the external power source to generate the first source voltage.

7. A signal processing apparatus comprising the integrated circuit of claim 4, wherein
the signal processing apparatus further comprises a source voltage selecting unit that outputs either one of the first source voltage and the second source voltage in accordance with a result of determination by the source voltage monitoring unit, the source voltage selecting unit being connected to the external power source and the internal power source, and wherein
the integrated circuit operates in accordance with either one of the first source voltage and the second source voltage as output by the source voltage selecting unit.

8. The signal processing apparatus of claim 7, further comprising a regulating circuit that regulates the level of the source voltage supplied from the external power source to generate the first source voltage.

9. The signal processing apparatus of claim 7, further comprising a non-volatile memory for storing the digital data, wherein
the digital signal processing circuit reads out the digital data stored in the non-volatile memory and performs decoding processing.

* * * * *